United States Patent
Ramaswamy

(10) Patent No.: US 9,349,180 B1
(45) Date of Patent: May 24, 2016

(54) VIEWPOINT INVARIANT OBJECT RECOGNITION

(71) Applicant: Amazon Technologies, Inc., Reno, NV (US)

(72) Inventor: Sharadh Ramaswamy, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 173 days.

(21) Appl. No.: 13/897,274

(22) Filed: May 17, 2013

(51) Int. Cl.
*G06K 9/00* (2006.01)
*G06T 7/00* (2006.01)
*G06K 9/46* (2006.01)

(52) U.S. Cl.
CPC .............. *G06T 7/004* (2013.01); *G06K 9/4642* (2013.01); *G06K 9/4671* (2013.01); *G06K 9/4676* (2013.01); *G06T 7/0075* (2013.01); *G06T 2207/10012* (2013.01)

(58) Field of Classification Search
None
See application file for complete search history.

(56) References Cited

U.S. PATENT DOCUMENTS

| | | | | |
|---|---|---|---|---|
| 2006/0221072 A1* | 10/2006 | Se et al. | ......................... | 345/420 |
| 2011/0134221 A1* | 6/2011 | Lee et al. | ......................... | 348/46 |
| 2013/0132377 A1* | 5/2013 | Lin et al. | ......................... | 707/723 |
| 2015/0304634 A1* | 10/2015 | Karvounis | ......... | H04N 13/0239 348/46 |

OTHER PUBLICATIONS

Wikipedia, the free encyclopedia, "Bag-of-words model in computer vision," downloaded from the Internet on Apr. 10, 2014, 6 pages. http://en.wikipedia.org/wiki/Bag-of-words_model_in_computer_vision.
Csurka, Gabriella, Dance, Christopher R., Fan, Lixin, Willamowski, Jutta and Bray, Cédric, "Visual Categorization with Bags of Keypoints," downloaded from the Internet on Apr. 10, 2014, 16 pages. http://www.google.com/url?sa=t&rct=j&q=esrc=s&frm=1&source=web&cd=1&sqi=2&ved=0CCsQFjAA&url=http%3A%2F%2F217.109.185.161%2Findex.php%2Fcontent%2Fdownload%2F20785%2F148346%2Ffile%2F2004_010.pdf&ei=MMNGU8WxJM6Shgeg04HICA&usg=AFQjCNG1ls-VN19mwWbAW-ol3BCdKCT858A&bvm=bv.64507335.d.b2l.

* cited by examiner

*Primary Examiner* — Sumati Lefkowitz
*Assistant Examiner* — Ryan P Potts
(74) *Attorney, Agent, or Firm* — Polsinelli LLP

(57) ABSTRACT

Utilizing viewpoint and scale invariant feature descriptors for object recognition and/or tracking. For example, a user can capture three-dimensional ("3D") image data including a representation of an object. The 3D image data can be analyzed to detect one or more feature points of the object represented in the image data, where the detected feature points can include position and distance information. The feature points in each image can be correlated and a feature descriptor, or unique fingerprint, can be determined for each detected feature point. The feature descriptors can provide for a multi-dimension vector that includes a unique fingerprint for that feature point that incorporates position information as well as depth information. The feature descriptors corresponding to the correlated feature points can be combined (e.g., added, averaged, etc.) and the combined feature descriptors can be used for performing view point invariant object recognition, image matching, or other such purposes.

23 Claims, 7 Drawing Sheets

VIEWPOINT INVARIANT OBJECT RECOGNITION

BACKGROUND

People are increasingly interacting with computers and other electronic devices in new and interesting ways. For example, mobile devices are increasingly offering multiple high quality cameras that enable additional types of functionality. In some of these devices, one or more pairs of these high quality cameras can be used to provide three-dimensional ("3D") image capture, such as stereoscopic image capture, for both still and video imaging. Additionally, the availability of these high quality cameras allows for a growing number of large digital image collections, where applications operating on these devices can use the camera to initiate search queries about objects in visual proximity to the user. Such applications can be used for identifying products, comparison shopping, finding information about movies, etc. Conventional systems have utilized feature-based object tracking algorithms, such as scale-invariant feature transform (SIFT) or speeded up robust feature (SURF) algorithm, to identify distinguishing feature points and calculate descriptors (unique fingerprints) for each feature point. In order to match the feature points identified by these algorithms to real-world objects, a computing device, or system in communication therewith, must compare the feature points to images stored for these real-world objects. Unfortunately, since there are so many objects and feature points, image databases often lack images from all possible angles and under various types of lighting conditions. Further, the feature points can be subject to geometric and photometric distortions encountered when the user captures the query photo from an arbitrary viewpoint, which often leads to unrecognized or misrecognized information.

BRIEF DESCRIPTION OF THE DRAWINGS

Various embodiments in accordance with the present disclosure will be described with reference to the drawings, in which.

DETAILED DESCRIPTION

Figure 1:
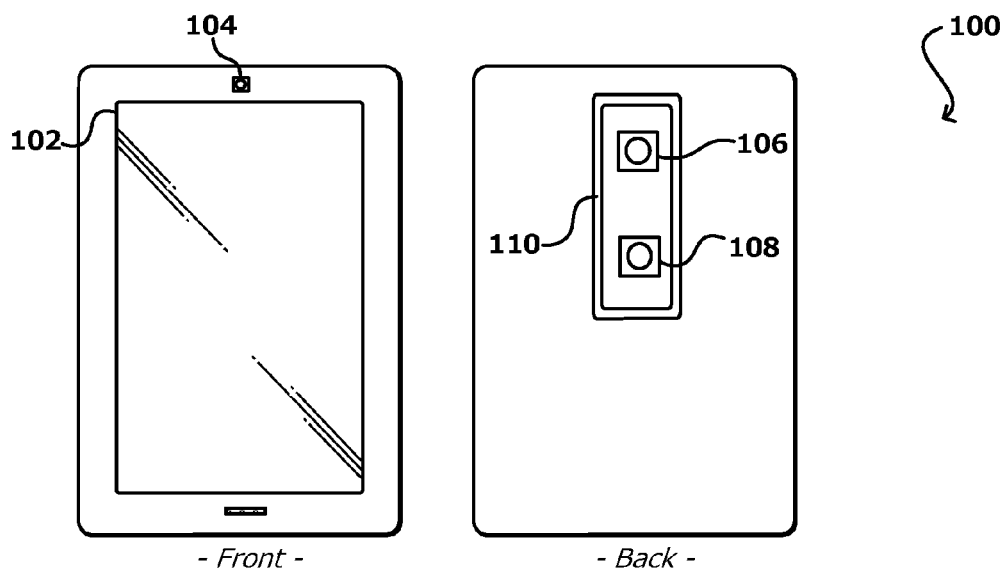
FIG. 1 illustrates front and back views of an example computing device including a conventional pair of cameras for 3D imaging that can be utilized in accordance with various embodiments.

Systems and methods in accordance with various embodiments of the present disclosure may overcome one or more of the aforementioned and other deficiencies experienced in conventional approaches for acquiring image information using an electronic device. In particular, various embodiments can determine viewpoint- and scale-invariant feature descriptors for purposes such as object recognition and/or tracking. For example, a user can capture three-dimensional ("3D") image data using at least two cameras. The 3D image data can be analyzed to detect feature points of an object represented in the image data, which typically corresponds to corners, intersection points, local minima or maxima, or other such representative features, where the detected feature points from the 3D image data will have associated position data, which will include distance information. Distance information can be obtained in other ways as well in other embodiments, such as by using ultrasonic sensors, infrared flash intensity analysis, and other such relevant distance-determining techniques.

The feature points in each image can be correlated and a feature descriptor, or unique fingerprint, can be determined for each detected feature point using at least one of a scale-invariant feature transform (SIFT), speeded up robust feature (SURF), or other similar algorithm. The feature descriptors can be representations of a neighborhood of pixels (e.g., at least a portion of the area around and/or including each feature point) and can provide for a multi-dimension vector that includes an unique fingerprint for that feature point that incorporates position information as well as depth information. The feature descriptors corresponding to the correlated feature points can be combined (e.g., added, averaged, etc.) and the combined feature descriptors can be used for view point invariant object recognition, image matching, or other such purposes.

Other approaches can be used as well for object recognition and/or tracking. For example, the viewpoint invariant feature descriptors can be combined by the process of "bagging" (e.g., quantized histogramming—creating a bag of image words describing the image). In this instance, each viewpoint invariant feature descriptor is associated with a predetermined feature descriptor cluster (i.e., a "bag"), where each cluster can correspond to at least a portion of an object. A number of feature descriptors assigned to a particular feature descriptor cluster can be determined, and a histogram of the number of occurrences of a feature descriptor in a given image can be determined. Accordingly, the image can be represented as a normalized histogram of viewpoint invariant feature descriptors, and this normalized histogram of viewpoint invariant feature descriptors can be used to identify one or more objects in the image, regardless of the angle at which the image is captured and/or the scale of the captured image. Various other applications, processes, and uses are presented below with respect to the various embodiments.

As mentioned above, electronic devices can offer 3D imaging using at least one pair of cameras, such as high resolution matched cameras. For example, FIG. 1 illustrates front and back views of an example electronic device 100 wherein a front of the device includes a display screen 102 and other input elements, such as a front-facing camera 104 for video chat or other such purposes. The display can be, for example, a glasses-free 3D capable display, a display capable of presenting glasses-assisted 3D image information, or a conventional 2D display. The device also includes a pair of matched cameras 106, 108 on the back side of the device. These cameras are separated a distance sufficient to enable three-dimensional imaging and typically are relatively high resolution cameras (e.g., 5.0 MP or above for conventional devices). Processes discussed herein provide for determining one or more viewpoint and scale invariant feature descriptors used for object recognition and/or tracking.

For example, in at least one embodiment, an application (e.g., an application used for identifying products, comparison shopping, etc.) executing on a computing device, or service in communication with the computing device, can attempt to identify at least one object represented in an image regardless of the viewpoint, orientation, or position of the computing device used to capture the image. In a conventional computing device, the application can attempt to recognize an object represented in an image by comparing the received image to images stored in an image database. However, as described, the image database may lack reference images for particular angles, orientations, etc., which can lead to unrecognized or misrecognized objects. Accordingly, in accordance with various embodiments, one or more algorithms for detecting features of the object represented in the image, either on the computing device or on a service in communication therewith, can determine viewpoint and scale invariant features and descriptors useful in identifying the objects. The identified objects represented by at least viewpoint invariant feature descriptors can be compared to one or more entries in the database in order to recognize identified objects represented in the image, e.g., in response to a visual search query. Thereafter, the user can be presented with information about the object, such as a description of the object, where to purchase the object, a name of the object, physical characteristics associated with the object, pricing information associated with the object, history information, among others. Additionally or alternatively, the information can be provided to at least one of an electronic store application, a data retrieval application, or one or more applications (web or device) or services. The applications and/or services can reside on the device, or the device can be in communication with such applications and/or services.

Figure 2:
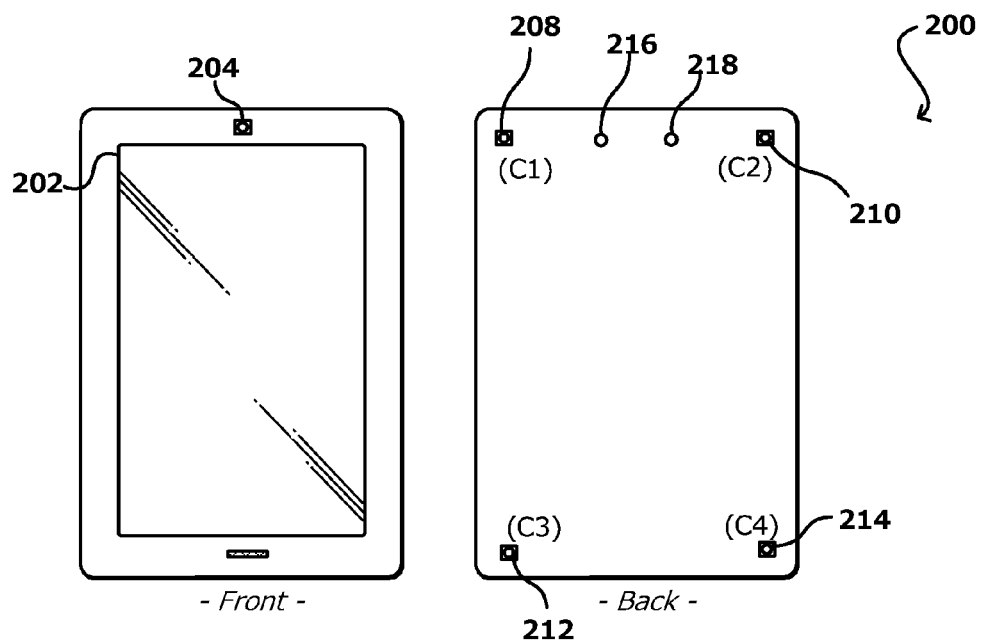
FIG. 2 illustrates front and back views of an example computing device including a multiple cameras capable of providing 3D imaging in accordance with various embodiments.

FIG. 2 illustrates front and back views of another electronic device 200 that can be utilized in accordance with various embodiments. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, cellular phones, video gaming consoles or controllers, and portable media players, among others. The electronic device can utilize some of the same elements as a conventional device, such as may include a display screen 202 and at least one front-facing camera 204. This example also includes four cameras 208, 210, 212, 214 arranged to provide at least two stereoscopic imaging pairs. These cameras are labeled C1, C2, C3, and C4 for reference, as used later herein. While shown on the backside of the device in this example, it should be understood that the pairs could be on the front of the device or in one or more other appropriate locations. Further, while two pairs of stereoscopic cameras are illustrated, it should be understood that there can be additional pairs of cameras utilized as well as discussed elsewhere herein. The example device can include other elements useful for imaging as well, such as a light sensor 216 for determining an amount of ambient light and a white light LED 218, or other such illumination element, useful in illuminating objects within at least a portion of a field of view of at least one of the cameras 208, 210, 212, 214. Each image capture element may be, for example, a camera, a complimentary metal-oxide semiconductor (CMOS) device, or another appropriate image capturing element or sensor. It should be understood that while certain elements are shown to be included on a "front" or "back" side of the device that any or all of these elements can be positioned on various sides, edges, faces, or other regions of such a device. Further, terms such as "front," "back," and "top" are used for purposes of explanation and are not intended to be interpreted as required orientations unless otherwise stated. Further still, while terms such as "rectangular grid" or "rectangular pattern" are used herein to describe the relative arrangements of various cameras, it should be understood that pairs of cameras in such a system are positioned along orthogonal axes, such as horizontal and vertical axes, such that a camera of a pair is positioned horizontally or vertically (or along other orthogonal axes) with respect to another camera of the pair. It should be noted that the cameras do not have to form a proper rectangle, but can form other patterns such as a cross, set of parallel lines, points along a rectilinear grid, etc. Various other geometries and arrangements can be used as well within the scope of the various embodiments.

For any pair of these cameras that have at least a partially overlapping field of view, three-dimensional imaging can be performed by capturing image information for one or more objects from two different perspectives or points of view, and combining the information to produce a 3D image. Methods for producing a 3D image using image information from different perspectives are well known in the art and will not be described in detail herein. Example approaches include calculating an amount of disparity through a process such as edge matching, feature location and matching, color matching, and/or texture matching, and combining the disparity information with color information from each perspective to generate a three-dimensional image, either before or at a time of display. For example, if the image information is matched then the image information can be combined and/or displayed directly on a 3D-capable display, wherein the human brain can effectively do at least some of the 3D processing. In other examples, the image information can be otherwise combined or processed at the time of display such that upon displaying the information a 3D image is generated. It should be understood, however, that 3D image data can be used for other purposes or for further processing, such that using the image data to generate and display a 3D image is not required. For example, the data can be used to determine shape and/or relative position information for various computer vision techniques, such as for determining one or more viewpoint and scale invariant feature descriptors used for object recognition and/or tracking.

Figure 3A:
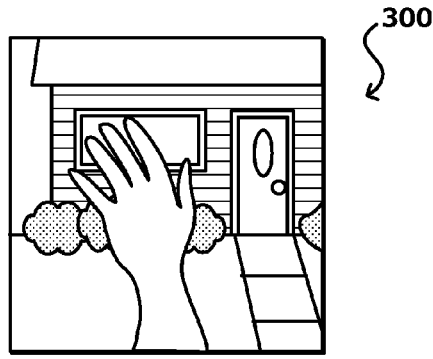
FIGS. 3(a), 3(b), 3(c), and 3(d) illustrate examples of images that can be used and/or generated using stereoscopic cameras to obtain disparity information that can be leveraged in accordance with various embodiments.
Figure 3B:
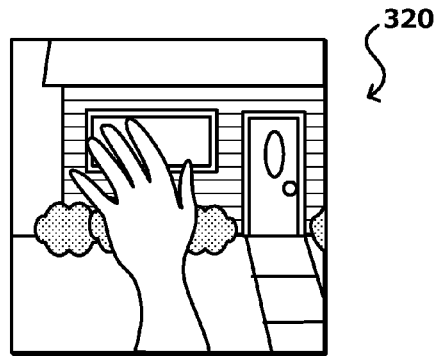
Figure 3C:
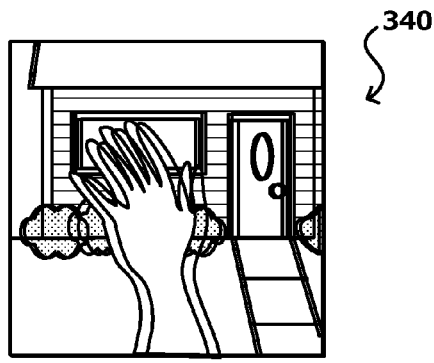
Figure 3D:
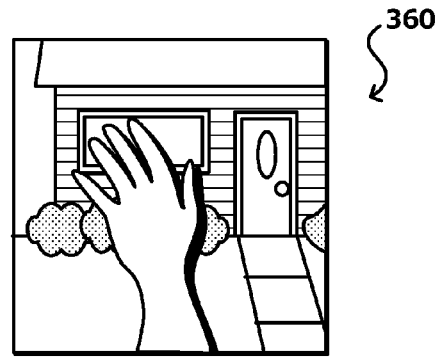

FIGS. 3(a), 3(b), and 3(c) illustrate one such approach for shape and/or relation position information that can be used in determining viewpoint and scale invariant feature descriptors. FIG. 3(a) illustrates what will be referred to herein as a "left" image 300 and FIG. 3(b) illustrates what will be referred to herein as a "right" image 320, although other orientations can be used as well in other situations and embodiments. These images are each captured by one of a pair of cameras that are offset from each other along a horizontal axis, such that one camera is offset to the left and one offset to the right in this orientation. As discussed elsewhere herein, pairs of cameras can be offset in up and down directions, among other such options. Since each image is captured using a camera at a slightly different location, the position of objects in each image will be different. As an example, if one were to overlay one of these images 300 on top of the other 320, as illustrated in the example image 340 of FIG. 3(c), it can be seen that each of the objects is slightly offset, with objects closer to the camera being more offset than others, due to disparity differences as discussed previously. When displayed and/or viewed as a three dimensional image, however, the disparity causes the objects in the image to appear to be located at different depths, as illustrated in the image 360 of FIG. 3(d), resulting from the disparity between the two images.

In order for the images to combine to form an accurate three-dimensional image, the cameras used to capture the component images should be sufficiently aligned and/or rectified to represent the correct amount of disparity. When the cameras are aligned, correlating or matching feature points between images captured with a stereoscopic camera pair can be determined based at least in part on an epipolar line between the respective images and determined coordinates for at least one of the feature points. Further, as described, disparity information can be used to obtain viewpoint invariant feature descriptors useful in image matching and other similar image processing approaches. For example, objects in an image can be matched with one or more predetermined objects in a database based at least in part on the viewpoint invariant feature descriptors, when, for example, the viewpoint invariant feature descriptors determined from a user uploaded image match viewpoint invariant feature descriptors for at least one image stored in a database.

Figure 4A:
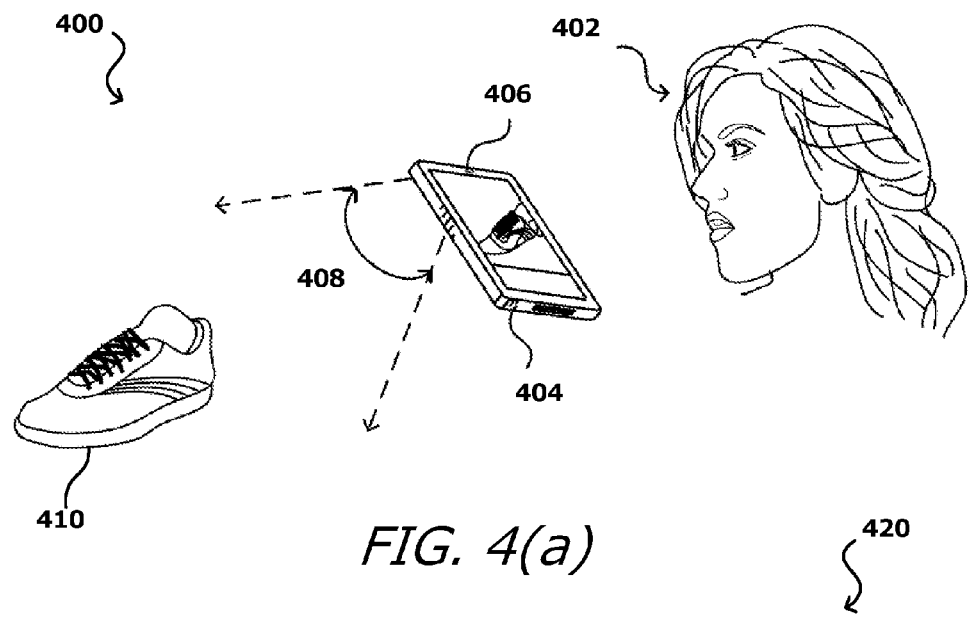
FIGS. 4(a), 4(b), and 4(c) illustrates an example situation of recognizing an object using viewpoint invariant feature descriptors in accordance with at least one embodiment.

For example, FIG. 4 (a) illustrates an example situation 400 in which a user 402 is capturing one or more images of a product 410 (i.e., the shoe), in accordance with at least one embodiment. Although a shoe is shown, it should be understood that the objects can be associated with monuments, buildings, consumer products, food items, and virtually any object with a uniquely recognizable geometry. The images can be obtained using one or more pairs of stereoscopic cameras. As discussed, this can include two or more pairs of cameras arranged in a pattern, such as a rectangle or regular array, such that different pairs of the cameras can be used to perform three-dimensional imaging, and the pairs can be selected in at least two different directions, which in at least some embodiments are orthogonal directions. Also, as discussed elsewhere herein, in at least some embodiments all cameras of interest do not have to capture a respective image at substantially the same time. Further, it should be understood, however, that a single camera could be used to capture images and/or video as well within the scope of the various embodiments.

As illustrated in example situation 400, a computing device 404 with the pair of stereo cameras 406 on the back can be pointed at the shoe such that the shoe is within the field of view 408 of the cameras. Since a display screen is on the opposite side of the device, a user holding the device can view the stereo image being captured, assuming the display is capable of rendering the stereo information for a two- or three-dimensional display. The user thus can view a three-dimensional view of the shoe as captured by the cameras and displayed on the display screen. It should be understood that a stereo image can be a combined image or can include a rendering of separate images captured by each of the stereo cameras in different embodiments.

Figure 4B:
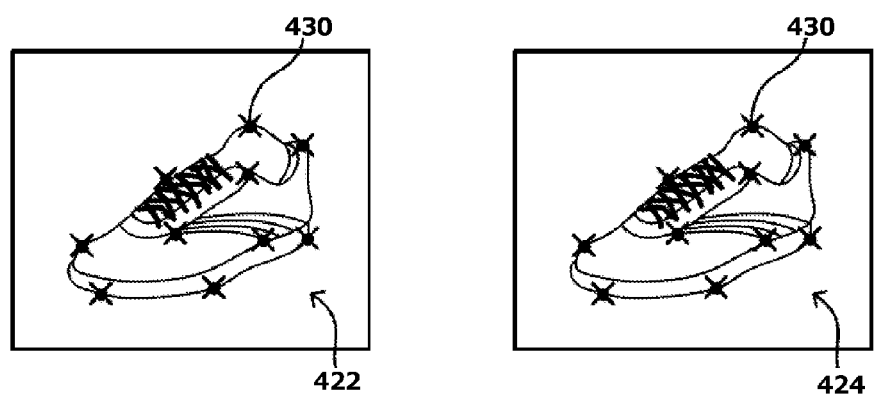

As illustrated in example situation 420 of FIG. 4(b), the pair of stereo cameras can capture a first image 422 and a second image 424. The offset of the cameras will cause the location of the shoe in each image to be slightly offset, where the amount of offset is a factor of the separation of the cameras and the distance from the cameras to the objects. This varying offset with distance, otherwise known as disparity, provides the perception of depth in the image when the images are combined using a stereovision process, and this depth information can be used when determining the viewpoint invariant feature descriptors. For example, the pair of images can be analyzed to determine a feature points 430 or other such aspects or portions of the image that can be located in the other images. As known for such purposes, feature points can be determined using algorithms such as feature detection algorithms (e.g., SIFT or SURF), corner finding algorithms, pattern matching algorithms, contour detection algorithms, and the like. For this example, the process uses a feature detection algorithm to locate specific points in each image. Corresponding feature points can then be located in each of the captured images, to the extent those feature points are represented in each of those images.

Thus, a feature point corresponding to an object represented in an image captured by two cameras will have two pairs of coordinates, with an (x,y) or other such pair of coordinates representing the location of that feature point in each image. As discussed elsewhere herein, the examples utilize a single feature point for purposes of explanation, but it should be understood that multiple feature points will generally be analyzed and/or otherwise utilized in various analyses within the scope of the various embodiments.

Once the feature points are detected, the feature points between the two images are correlated and a feature descriptor, or unique fingerprint, is determined for each feature point. For example, a SIFT, SURF, or similar algorithm can be used to represent the feature descriptor as a numerical vector, wherein each numerical vector includes information unique to the viewpoint from which the image was captured. The feature descriptors corresponding to the correlated feature points can be combined (e.g., added, averaged, etc., as is well known in the art). For example, in various embodiments, the feature descriptors are associated with a vector representation and combining the feature descriptors for the corresponding pairs of the plurality of feature points can include combining at least a subset of related vector representations. In this case, the representation of the feature descriptor is unique in the sense that the description in a first part of the vector is unique to a viewpoint from one angle and the description from the second half of the vector is unique from a viewpoint of another angle. This can be extended to the number of camera pairs used to obtain the image. The viewpoint invariant feature descriptors can be compared to images cataloged in an image database. For example, the viewpoint invariant feature descriptors of the shoe can be compared to feature descriptors of images stored in an image database. This can include, for example, analyzing differences between the vector representation of the combined feature descriptors and one or more stored vector representations to identify the shoe, wherein differences between the vector representation and the one or more stored vector representations are less than a determined matching threshold, such as a percentage. The images in the database can be associated with respective feature descriptors and/or other information and in response to a query for a visual search of the shoe, a matching shoe in the database can be determined when the viewpoint invariant feature descriptors of the queried shoe match viewpoint invariant feature descriptors for at least one shoe image stored in the image database.

Other approaches can be used as well in attempting to recognize an object in an image. For example, the viewpoint invariant feature descriptors can be combined by the process of "bagging" (e.g., quantized histogramming—creating a bag of image words describing the image). In this instance, each viewpoint invariant feature descriptor can be associated with a predetermined feature descriptor cluster (also referred to as an identifier of an object type), wherein each cluster can correspond to at least a portion of an object, and the object can include one or more clusters. Thus, an object can be represented by its one or more clusters. For example, a shoe can be identified by looking at the parts that make up the shoe. That is, when it is determined that the object represented in the image includes a number of shoestring holes, a shoe string, etc., the object can be classified as a shoe. Accordingly, the shoe can be represented as one or more clusters (the shoe lace, the shoe lace holes) and can be identified as a shoe by the frequency of occurrence of the viewpoint invariant feature descriptors.

In accordance with an embodiment, a plurality of clusters can be maintained in a database, where the database can be provided by a third party such as a provider of image search capabilities. Each cluster can be represented as a vector, and as described, the vector information can be representative of at least a portion of an object. It should be noted, however, that there are a number of ways in which to generate a database of feature descriptor clusters, the details of which are outside the scope of the embodiments presented herein. Accordingly, methods for generating a "visual vocabulary" (i.e., a catalog of viewpoint invariant interest point descriptors) are well known in the art, such that detailed description of the entire process, and explanation of all possible components, will not be discussed in detail herein.

Figure 4C:
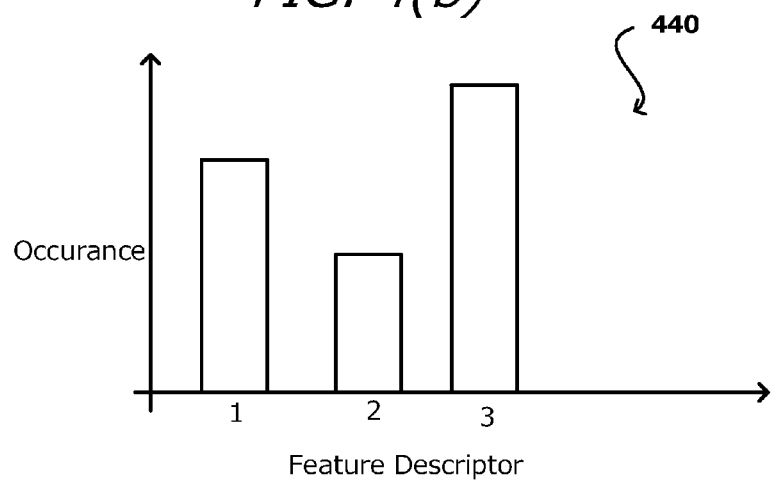

As described, an object can be identified by the frequency of occurrence of detected viewpoint invariant feature descriptors. For example, detected viewpoint invariant feature descriptors can be determined for an object represented in an image and each feature descriptor can be associated with a cluster based at least in part on a distance of a feature descriptor to one of the cluster centers. For example, the feature descriptor can be associated with a cluster closest to the feature descriptor, as determined by the distance between the feature descriptor and each of the cluster centers, and based at least on the associations of a feature descriptor to a cluster center, a histogram can be formed. For example, as illustrated in FIG. 4(c), the shoe can be represented by the frequency of occurrence of at least three clusters to form histogram 440, where the x-axis represents the different clusters and the y-axis represents the frequency of occurrence. Accordingly, the object can be represented by the shape of the histogram. In this way, an image can be represented as a plurality of viewpoint invariant interest point descriptors, where each viewpoint invariant interest point descriptor can be mapped to a corresponding cluster and the image can be represented as a histogram of the number of occurrences of a particular interest point descriptor.

Figure 5:
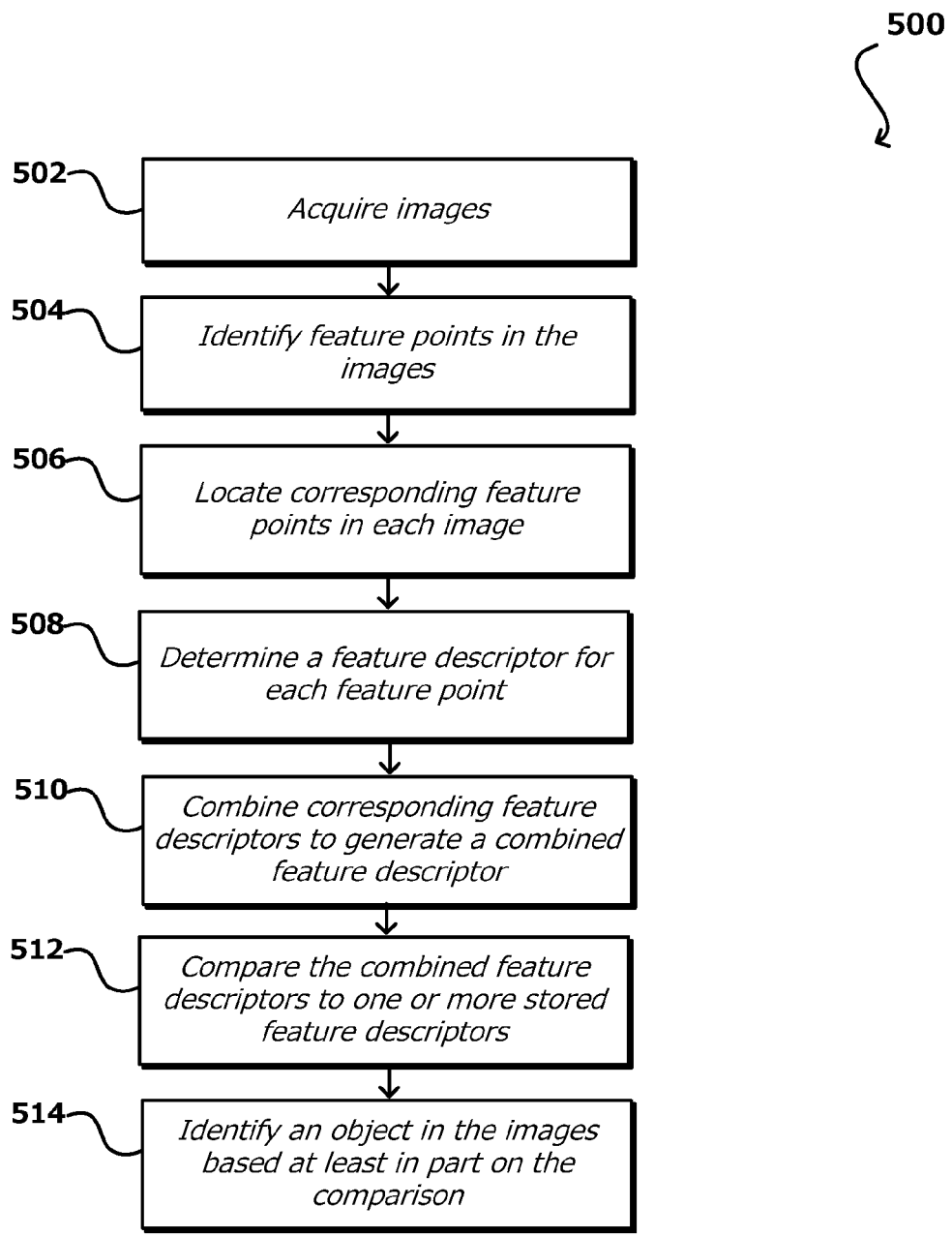
FIG. 5 illustrates an example process for recognizing an object using viewpoint invariant feature descriptors in accordance with an embodiment.

FIG. 5 illustrates one example process 500 for recognizing an object with a computing device using viewpoint invariant feature descriptors in accordance with various embodiments. It should be understood that, for any process discussed herein, there can be additional, fewer, or alternative steps performed in similar or alternative orders, or in parallel, within the scope of the various embodiments unless otherwise stated. In this example, images including an object to be identified are acquired 502 using one or more stereo camera pairs. For example, a first image can be captured by a first camera of a computing device and a second image can be captured by a second camera of the computing device. As discussed, this can include two or more pairs of cameras arranged in a pattern, such as a rectangle or regular array which can include having their optical axes being substantially parallel, such that different pairs of the cameras can be used to perform stereoscopic imaging, and the pairs can be selected in at least two different directions, which in at least some embodiments are orthogonal directions. Also, as discussed elsewhere herein, in at least some embodiments all cameras of interest do not have to capture a respective image at substantially the same time, but at least pairs of cameras to be rectified should capture images at substantially the same time. Each captured image can be analyzed to identify 504 a plurality of feature points corresponding to an object represented in each image of the first image and the second image. As known for such purposes, feature points can be determined using algorithms such as feature detection algorithms, including, but not limited to a Moravec corner detection algorithm, a Harris corner detection algorithm, a FAST corner detection algorithm. Additionally, feature descriptors can be determined using at least one of a scale-invariant feature transform (SIFT) algorithm, speeded up robust feature (SURF) algorithm, a gradient location and orientation histogram algorithm, a rotation-invariant feature transform (RIFT) algorithm, a Canny algorithm, a local texture descriptor algorithm among other pattern matching algorithms, contour detection algorithms, and the like. For this example, the process uses a feature detection algorithm to locate specific points in each image. Corresponding feature points can then be located 506 in each of the captured images, to the extent those feature points are represented in each of those images. For example, when the cameras are aligned, corresponding feature points can be located based at least in part on an epipolar line between the respective images and determined coordinates for at least one of the feature points.

The feature points in each image can be correlated and a feature descriptor, or unique fingerprint, can be determined 508 for each feature point in each image using at least one of a scale-invariant feature transform (SIFT), speeded up robust feature (SURF), or other similar algorithm. The feature descriptors can be representations of a neighborhood of pixels (e.g., at least a portion of the area around and/or including each feature point) and can provide for a multi-dimension vector that includes an unique fingerprint for that feature point that incorporates position information as well as depth information. The feature descriptors for the corresponding pairs of the feature points can be combined 510 (e.g., added, averaged, etc.) to generate combined feature descriptors, wherein each combined feature descriptor can be a vector representation of one of the corresponding pairs of the plurality of feature points from a first viewpoint corresponding to the first camera and a second viewpoint corresponding to the second camera. As described, the combined feature descriptors can be used for view point invariant object recognition, image matching, or other such purposes. For example, the viewpoint invariant feature descriptors can be compared 512 to one or more stored combined feature descriptors for a set of objects cataloged in a database. In response to a visual search query, a matching object in the database can be identified 514 upon locating at least one stored combined feature descriptor for the set of objects that matches the combined feature descriptors within an allowable amount of deviation. Thereafter, the computing device can be provided information associated with the object to the computing device, wherein the information includes at least one of a name of the object, a description of physical characteristics associated with the object, pricing information associated with the object, or informational information associated with the object.

Figure 6:
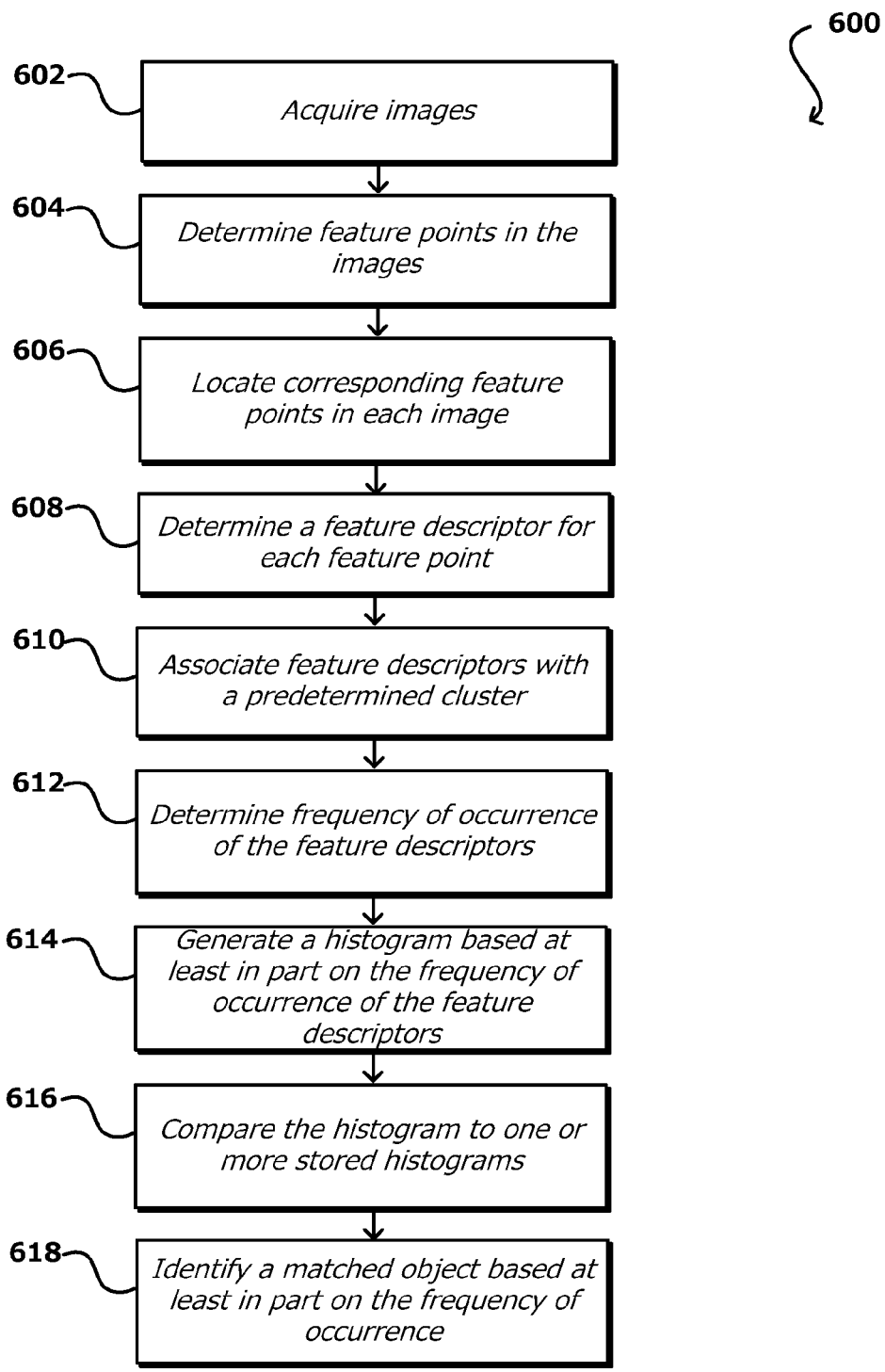
FIG. 6 illustrates an example process for recognizing an object using viewpoint invariant feature descriptors in accordance with an alternate embodiment.

FIG. 6 illustrates another example process 600 for determining viewpoint invariant feature descriptors in accordance with various embodiments. As with the prior example, images are acquired 602 using each camera to be rectified, and each captured image can be analyzed to determine 604 feature points or other such aspects or portions of the image that can be located in the other images. Corresponding feature points can then be located 606 in each of the captured images, to the extent those feature points are represented in each of those images. Once the feature points are detected, the feature points can be correlated and a feature descriptor can be determined 608 for each detected feature point.

In accordance with an embodiment, the feature descriptors can be combined by the process of "bagging" (e.g., quantized histogramming which is known as creating a bag of image words describing the image). In this instance, each viewpoint invariant interest point descriptor can be associated with a predetermined interest point descriptor cluster, where each cluster can correspond to at least a portion of an object, and the object can be comprised of one or more clusters. Each cluster can be represented as a vector, and as described, the vector can be representative of at least a portion of an object including relative position and distance data.

Each detected viewpoint invariant feature descriptor can be associated 610 with a cluster based at least in part on a distance of a feature descriptor to one of the cluster centers for some defined geometric space. For example, the feature descriptor can be associated with a cluster closest to the feature descriptor, as determined by the distance between the feature descriptor and each of the cluster centers. The frequency of occurrence of each cluster can be determined 612 (e.g., the number of times a particular feature descriptor is associated with a cluster) to generate 614 a histogram representing the frequency of occurrences of each cluster, where the shape of the histogram can be representative of the object. The histogram can be normalized and the normalized histogram can be used to identify the object. For example, a classification service or other such service (residing on or remote from the computing device) can compare 616 to one or more stored normalized histograms for a set of objects, and based at least in part on the comparison, the object can be identified 618 upon locating at least one stored normalized histogram for the set of objects that matches the normalized histogram. Thereafter, information associated with the object can be provided to the computing device, wherein as described, the information includes at least one of a name of the object, a description of physical characteristics associated with the object, pricing information associated with the object, or informational information associated with the object.

Figure 7:
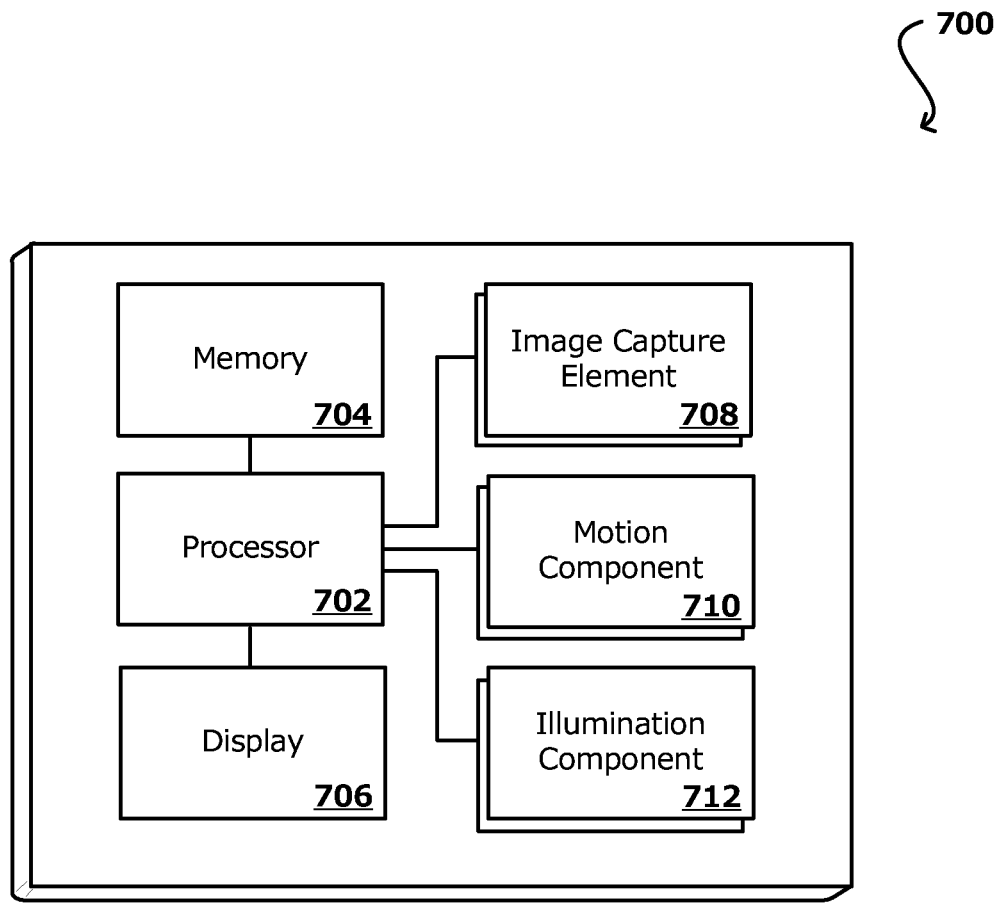
FIG. 7 illustrates an example set of basic components of a portable computing device, such as the device described with respect to FIG. 2.

FIG. 7 illustrates an example set of basic components of a computing device 700, such as the device 200 described with respect to FIG. 2. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc. The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 708, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one dedicated gesture component, such as an IR sensor or detector, operable to capture information for use in determining gestures or motions of the user, which will enable the user to provide input through the portable device without having to actually contact and/or move the portable device. The device can include at least one motion component 710, such as an accelerometer or inertial sensor to measure translation, an electronic compass to calibrate direction in up to three dimensions, an electronic gyroscope to determine and/or track changes in orientation, and other such elements. Motion determining elements can help in determining movement and using the determined movement to correct image information. The device also can include at least one illumination element 712, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 8:
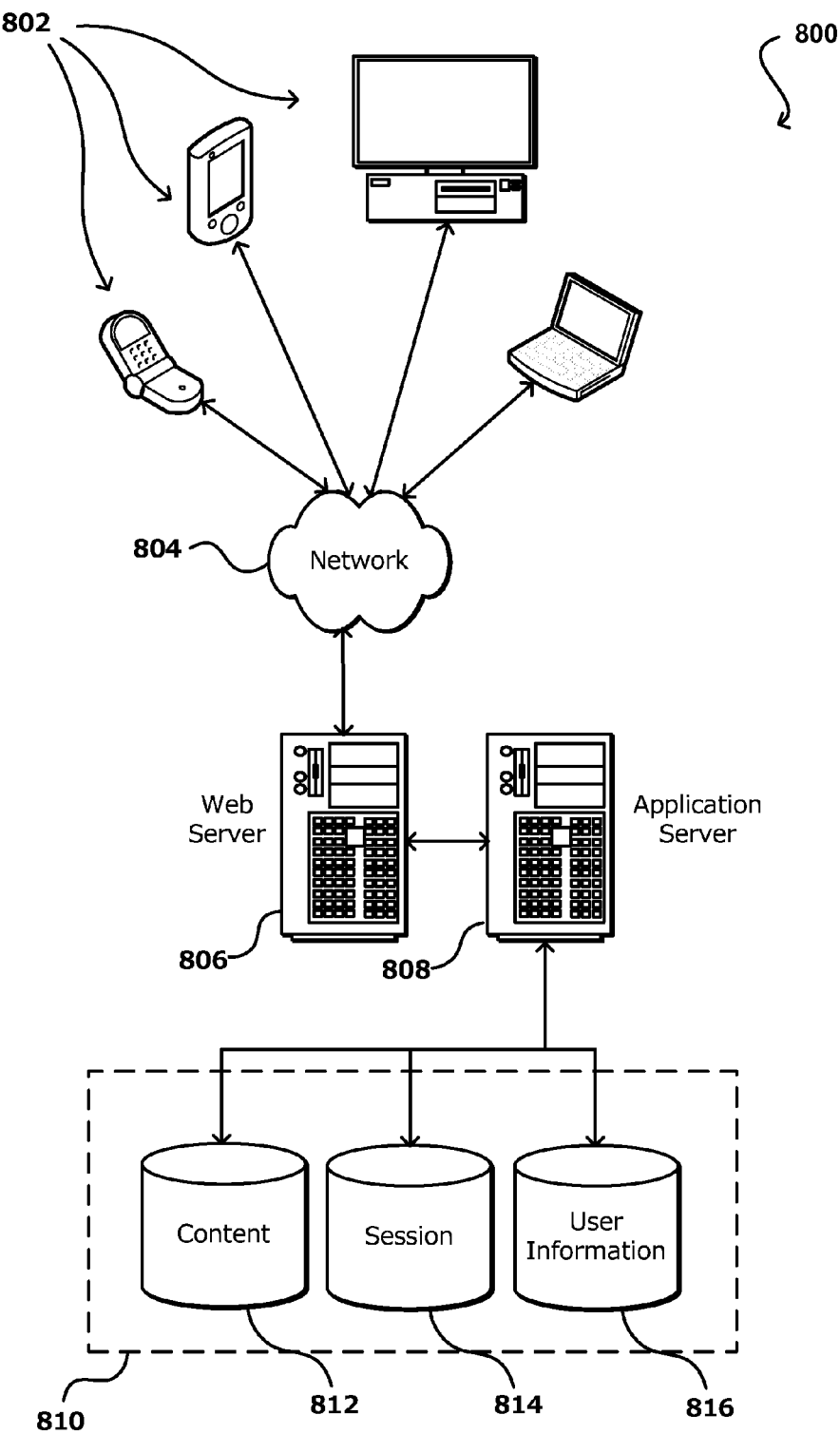
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor; and
   memory including instructions that, when executed by the at least one processor, cause the computing device to:
   receive a first image captured by a first camera of the computing device;
   receive a second image captured by a second camera of the computing device, the first camera and the second camera being offset by a determined amount and configured to acquire three-dimensional image information;
   identify a first plurality of feature points corresponding to an object represented in the first image;
   identify a second plurality of feature points corresponding to the object represented in the second image;
   determining a first feature descriptor for the first plurality of feature points;
   determining a second feature descriptor for the second plurality of feature points;
   correlate corresponding pairs of the first plurality of feature points and the second plurality of feature points;
   generating a combined feature descriptor based at least in part on the first feature descriptor and the second feature descriptor;
   comparing the combined feature descriptor to one or more stored combined feature descriptors for a set of objects; and
   identifying the object upon locating at least one stored combined feature descriptor for the set of objects that matches the combined feature descriptor.

2. The computing device of claim 1, wherein the first feature descriptor and the second feature descriptor is associated with a vector representation, and wherein combining the first feature descriptor and the second feature descriptor for the first plurality and the second plurality of feature points includes combining at least a subset of related vector representations.

3. The computing device of claim 2, wherein comparing the first feature descriptor and the second feature descriptor includes analyzing differences between the vector representation of the first feature descriptor and the second feature descriptor and one or more stored vector representations to identify the object, and wherein differences between the vector representation and the one or more stored vector representations are less than a determined matching threshold.

4. The computing device of claim 1, wherein the instructions when executed further cause the computing device to:
   associate each first feature descriptor and each second feature descriptor with a predetermined feature descriptor cluster;
   determine a frequency of occurrence of each first feature descriptor and each second feature descriptor associated with a particular predetermined feature descriptor cluster; and
   generate a histogram of the first feature descriptors and second feature descriptors representative of the object based at least in part on the frequency of occurrence of each first feature descriptor and each second feature descriptor.

5. The computing device of claim 4, wherein the instructions when executed further cause the computing device to:
   normalize the histogram of the first feature descriptors and second feature descriptors;
   compare the normalized histogram of the first feature descriptors and second feature descriptors to one or more stored normalized histograms of the first feature descriptors and second feature descriptors for a set of objects; and
   identify the object upon locating at least one stored normalized histogram for the set of objects that matches the normalized histogram.

6. The computing device, according to claim 1, further comprising converting the first feature descriptor into a first vector; and converting the second feature descriptor into a second vector.

7. The computing device, according to claim 6, wherein the combined feature descriptor is a third vector.

8. The computing device, according to claim 7, wherein generating the combined feature descriptor comprises combining the first feature descriptor and the second feature descriptor based at least in part on one of adding or averaging the first vector and the second vector to arrive at the third vector.

9. A computer implemented method, comprising:
   receiving a first image captured by a first camera of a computing device;

receiving a second image captured by a second camera of the computing device, the first camera and the second camera being configured for stereoscopic imaging;

identifying a first plurality of feature points corresponding to an object represented in the first image;

identifying a second plurality of feature points corresponding to the object represented in the second image;

determining a first feature descriptor for the first plurality of feature points;

determining a second feature descriptor for the second plurality of feature points;

correlating corresponding pairs of the first plurality of feature points and the second plurality of feature points;

generating a combined feature descriptor based at least in part on the first feature descriptor and the second feature descriptor;

comparing the combined feature descriptor to one or more stored combined feature descriptors for a set of objects; and identifying the object upon locating at least one stored combined feature descriptor for the set of objects that matches the combined feature descriptor.

10. The computer implemented method of claim 9, further comprising:

receiving a visual search query, wherein in response to the visual search query, further performing:

comparing the combined feature descriptor to one or more stored combined feature descriptors associated with the set of objects, each combined feature descriptor being a vector representation of the first plurality of feature points from a first viewpoint corresponding to the first camera and the second plurality of feature points from a second viewpoint corresponding to the second camera; and identifying at least one object from the set of objects matching an object represented in each image of the first image and the second image, the at least one object associated with identifying information.

11. The computer implemented method of claim 10, further comprising:

providing the identifying information to the computing device, wherein the identifying information includes at least one of a name of the object, a description of physical characteristics associated with the object, pricing information associated with the object, or history information associated with the object.

12. The computer implemented method of claim 10, wherein comparing the first feature descriptor and the second feature descriptor includes analyzing differences between a vector representation of the first feature descriptor and the second feature descriptor and one or more stored vector representations to identify the object, and wherein differences between the vector representation and the one or more stored vector representations are less than a determined matching threshold.

13. The computer implemented method of claim 9, wherein matching corresponding feature points further includes:

determining coordinates for a first plurality of feature points in the first image; and correlating the first plurality of feature points to the second plurality of feature points in the second image based at least in part on an epipolar line between the first image and the second image and the coordinates for the first plurality of feature points and the coordinates for the second plurality of feature points.

14. The computer implemented method of claim 9, further comprising:

associating each combined feature descriptor with an identifier of an identified object;

determining a frequency of occurrence of each combined feature descriptor associated with a particular identifier; and determining a geometric relationship defined by the frequency of occurrence of each combined feature descriptor, the geometric relationship representative of an object represented in each image of the first image and the second image.

15. The computer implemented method of claim 14, further comprising:

comparing the geometric relationship to entries stored in a database for a set of objects; and identifying at least one object from the set of objects matching an object represented in the first image and the second image within an allowable deviation.

16. The computer implemented method of claim 15, wherein the object identified corresponds to at least one portion of the first image and the second image.

17. The computer implemented method of claim 15, further comprising:

in response to identifying the at least one object, providing identifying information to the computing device, wherein the identifying information includes at least one of a name of the object, a description of physical characteristics associated with the object, pricing information associated with the object, or history information associated with the object.

18. The computer-implemented method of claim 9, wherein determining a first feature descriptor for the first plurality of feature points and a second feature descriptor for the second plurality of feature points further includes identifying an object represented in the first image and the second image and identifying a plurality of first and second feature points corresponding to the object represented in the first image and the second image; and wherein combining the first feature descriptor and the second feature descriptor to generate a combined feature descriptor.

19. The computer implemented method of claim 9, wherein determining feature points includes using at least one of a Moravec corner detection algorithm, a Harris corner detection algorithm, or a features from accelerated segment test (FAST) corner detection algorithm, and wherein determining the feature descriptor includes using at least one of a scale-invariant feature transform (SIFT) algorithm, a speeded up robust feature (SURF) algorithm, a gradient location and orientation histogram algorithm, a rotation-invariant feature transform (RIFT) algorithm, a Canny algorithm, or a local texture descriptor algorithm.

20. The computer implemented method of claim 9, wherein the first feature descriptor and the second feature descriptor is associated with a vector representation, and wherein combining the first feature descriptor and the second feature descriptor for the first plurality and second plurality of feature points includes combining at least a subset of related vector representations.

21. A non-transitory computer readable storage medium storing one or more sequences of instructions executable by one or more processors to perform a set of operations comprising:
- receiving a first image captured by a first camera of a computing device;
- receiving a second image captured by a second camera of the computing device, the first camera and the second camera being configured for stereoscopic imaging;
- identifying a first plurality of feature points corresponding to an object represented in the first image;
- identifying a second plurality of feature points corresponding to the object represented in the second image;
- determining a first feature descriptor for the first plurality of feature points;
- determining a second feature descriptor for the second plurality of feature points;
- correlating corresponding pairs of the first plurality of feature points and the second plurality of feature points;
- generating a combined feature descriptor based at least in part on the first feature descriptor and the second feature descriptor;
- comparing the combined feature descriptor to one or more stored combined feature descriptors for a set of objects; and
- identifying the object upon locating at least one stored combined feature descriptor for the set of objects that matches the combined feature descriptor.

22. The non-transitory computer readable storage medium of claim 21, further comprising instructions executed by the one or more processors to perform the operations of:
- comparing the combined feature descriptor to one or more entries for a set of objects;
- identifying at least one object from the set of objects matching an object represented in each of the first image and the second image, the at least one object associated with identifying information; and
- providing the identifying information to the computing device, wherein the identifying information includes at least one of a name of the object, a description of physical characteristics associated with the object, pricing information associated with the object, or history information associated with the object.

23. The non-transitory computer readable storage medium of claim 21, further comprising instructions executed by the one or more processors to perform the operations of:
- associating each combined feature descriptor with an identifier of an identified object;
- determining a frequency of occurrence of each combined feature descriptor associated with a particular identifier;
- determining a geometric relationship defined by the frequency of occurrence of each combined feature descriptor, the geometric relationship representative of an object represented in each of the first image and the second image;
- comparing the geometric relationship to entries stored in a database for a set of objects; and
- identifying at least one object from the set of objects matching an object represented in each of the first image and the second image within an allowable deviation.

* * * * *